(12) United States Patent
Tandon et al.

(10) Patent No.: US 9,876,988 B2
(45) Date of Patent: Jan. 23, 2018

(54) VIDEO DISPLAY MODIFICATION FOR VIDEO CONFERENCING ENVIRONMENTS

(75) Inventors: Ankit Tandon, Bellevue, WA (US); Robert Aichner, Bellevue, WA (US); Ross Cutler, Redmond, WA (US); Senthil Velayutham, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 13/548,438

(22) Filed: Jul. 13, 2012

(65) Prior Publication Data

US 2014/0019883 A1    Jan. 16, 2014

(51) Int. Cl.
*H04N 7/15* (2006.01)

(52) U.S. Cl.
CPC .................................. *H04N 7/152* (2013.01)

(58) Field of Classification Search
CPC ........................................................ G06F 3/01
USPC .................... 709/217, 205; 715/756, 753
See application file for complete search history.

(56) References Cited

U.S. PATENT DOCUMENTS

| | | | | |
|---|---|---|---|---|
| 5,872,923 A * | 2/1999 | Schwartz | ................. | G06F 3/038 348/E7.083 |
| 6,608,636 B1 * | 8/2003 | Roseman | ................. | G09B 5/14 348/E7.083 |
| 7,124,355 B1 * | 10/2006 | Kukkal | ............. | G06F 17/30861 707/999.202 |
| 7,149,367 B2 | 12/2006 | Cutler | | |
| 7,554,571 B1 * | 6/2009 | Beck | ...................... | H04N 7/147 348/14.07 |
| 7,801,330 B2 | 9/2010 | Zhang et al. | | |
| 8,502,856 B2 * | 8/2013 | Cranfill | ................. | H04N 7/147 348/14.02 |
| 2006/0215765 A1 * | 9/2006 | Hwang | .................. | H04N 7/152 375/240.21 |

(Continued)

FOREIGN PATENT DOCUMENTS

| | | |
|---|---|---|
| AU | 2008264173 A1 | 7/2010 |
| CN | 102077587 A | 5/2011 |

(Continued)

OTHER PUBLICATIONS

James L. Crowley, et al.; "Robust Tracking and Compression for Video Communication;" International Workshop on Recognition, Analysis, and Tracking of Faces and Gestures in Real-Time Systems; Sep. 27, 1999; pp. 1-8; http://www-prima.inrialpes.fr/Prima/Homepages/jlc/papers/ICCV99-workshop.pdf.

(Continued)

*Primary Examiner* — David Choi

(57) ABSTRACT

Provided herein are systems, methods, and software for facilitating a video conference environment. In at least one implementation, video captured of a scene is received. A modification to display of the video is identified based at least in part on a share of a display space associated with an object in the scene relative to a share of another display space associated with another object in another scene. The modification to the display of the video is then initiated. In another implementation, the modification may also be based on a target share indicated by way of an interactive graphic.

17 Claims, 7 Drawing Sheets

(56) References Cited

U.S. PATENT DOCUMENTS

| | | | |
|---|---|---|---|
| 2009/0144653 A1* | 6/2009 | Ubillos | G06F 3/0483 715/800 |
| 2010/0157040 A1 | 6/2010 | Ofir | |
| 2010/0172581 A1 | 7/2010 | Husoy | |
| 2010/0245532 A1 | 9/2010 | Kurtz et al. | |
| 2010/0333004 A1* | 12/2010 | Kristiansen | G06F 3/04883 715/765 |
| 2014/0019883 A1* | 1/2014 | Tandon | H04N 7/152 715/756 |

FOREIGN PATENT DOCUMENTS

| | | |
|---|---|---|
| CN | 102474593 A | 5/2012 |
| CN | 102498717 A | 6/2012 |
| JP | 2007251355 A | 9/2007 |
| JP | 2008236679 A | 10/2008 |
| JP | 2010171690 A | 8/2010 |
| JP | 2010171695 A | 8/2010 |
| WO | 2010/141023 A1 | 12/2010 |

OTHER PUBLICATIONS

Erik Murphy-Chutorian, et al.; "Head Pose Estimation in Computer Vision: A Survey;" IEEE Transactions on Pattern Analysis and Machine Intelligence; Apr. 2009; pp. 1-20; vol. 31, Issue 4; http://people.ict.usc.edu/~gratch/CSCI534/Head%20Pose%20estimation.pdf.

Kevin Smith, et al.; "Multi-Person Tracking in Meetings: A Comparative Study;" 3rd Joint Workshop on Multimodal Interaction and Related Machine Learning Algorithms, USA; May 2006; pp. 1-12; vol. 4299; http://cvlab.epfl.ch/~ksmith/papers/SMITH_MLMI06.pdf.

T. Darrell, et al.; "Integrated Person Tracking Using Stereo, Color, and Pattern Detection;" Conference on Computer Vision and Pattern Recognition, Santa Barbera; Jun. 1998; pp. 1-10; http://wotan.liu.edu/docis/lib/musl/rclis/dbl/ijcovi/(2000)37%253A2%253C175%253AIPTUSC%253E/www.ai.mit.edu%252Fpeople%252Ftrevor%252Fpapers%252F1998-021%252FTR-1998-021.pdf.

"International Search Report & Written Opinion for PCT Patent Application No. PCT/US2013/049821", dated May 15, 2014, Filed Date: Jul. 10, 2013, 10 Pages.

Zicheng Liu, "Head-Size Equalization for Improved Visual Perception in Video Conferencing," IEEE Transactions on Multimedia, vol. 9, No. 7, Nov. 2007, 8 pgs.

"Office Action and Search Report Issued in Chinese Patent Application No. 201380037415.X", dated Apr. 25, 2017, 16 Pages.

"Office Action Issued in Japanese Patent Application No. 2015-521763", dated Jun. 20, 2017, 5 Pages.

"Second Office Action and Search Report Issued in Chinese Patent Application No. 201380037415.X", dated Sep. 28, 2017, 9 Pages.

"Office Action Issued in Japanese Patent Application No. 2015-521763", dated Oct. 17, 2017, 3 Pages. (without English Translation).

* cited by examiner

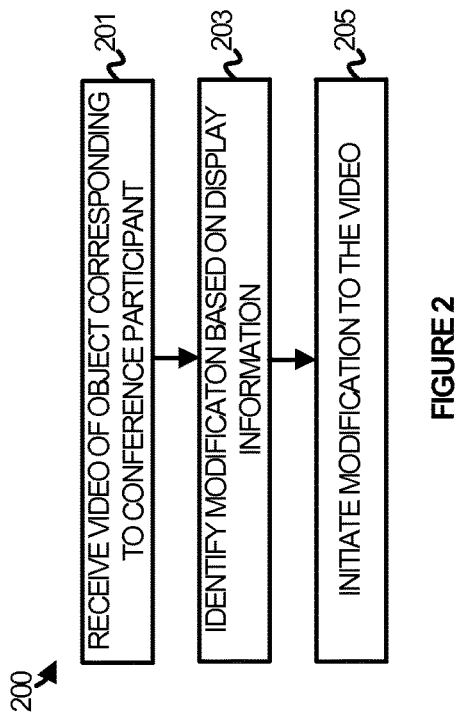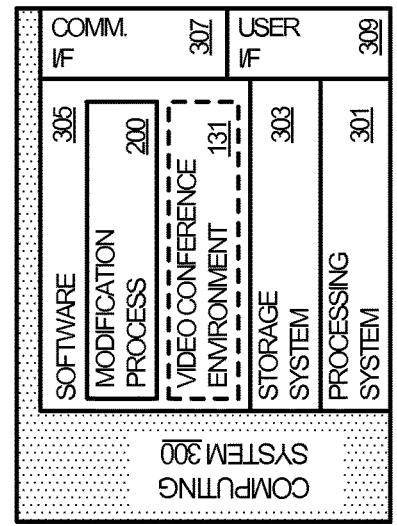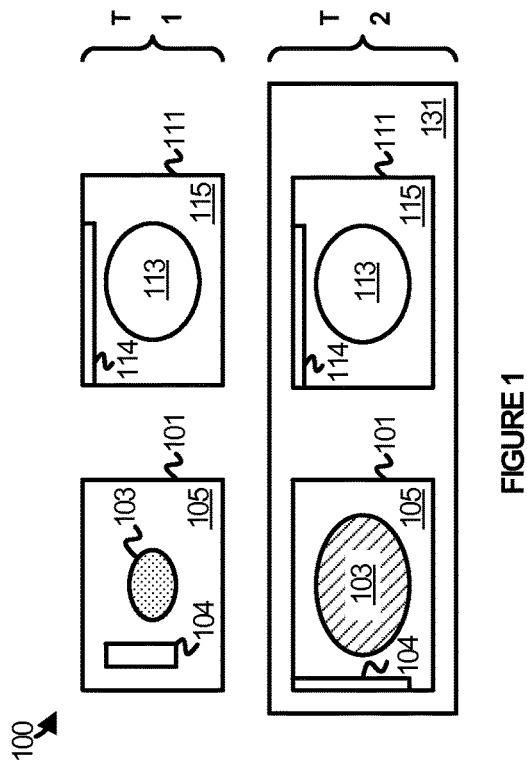

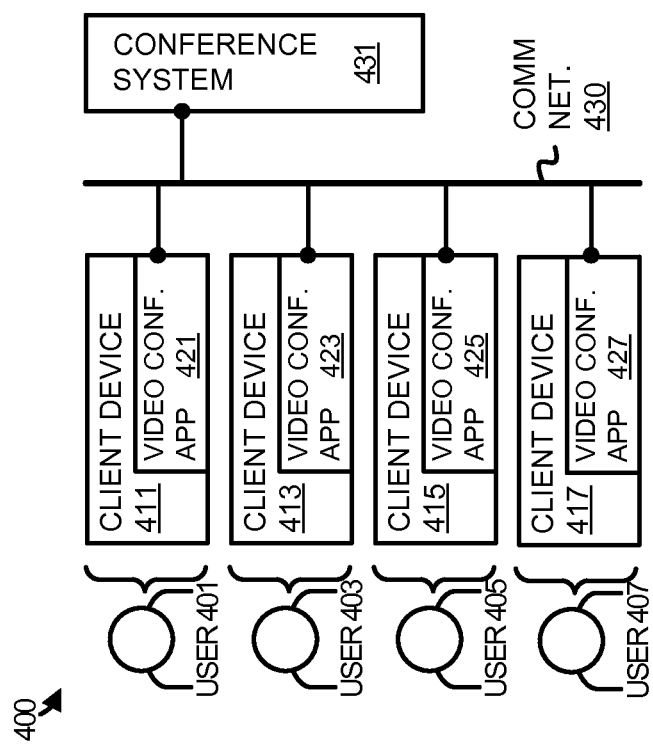

VIDEO DISPLAY MODIFICATION FOR VIDEO CONFERENCING ENVIRONMENTS

TECHNICAL FIELD

Aspects of the disclosure are related to computer hardware and software technologies and in particular to video conferencing solutions.

TECHNICAL BACKGROUND

Video conferencing involves the interconnection of two or more parties to communicate via an exchange of video. A wide variety of conferencing applications have developed to allow for video conferences that are easy to establish and manage. Participants can join prescheduled conferences but can also initiate impromptu conferences. Most conferencing applications allow participants to connect with each other using phone numbers, email addresses, and service handles, as well as many other suitable mechanisms.

As the feasibility of video conferencing has increased, so too have the ways and environments in which it can be delivered. For example, conference participants may engage in a video session using traditional desktop or laptop computers, as well as tablets, mobile phones, gaming systems, dedicated conferencing systems, or any other suitable communication device. Different architectures can be employed to deliver video conferencing solutions, including centrally managed and peer to peer architectures.

Many video conferencing solutions display video of each participant within display windows arrayed within the application. The presentation of video within each display window may vary considerably depending upon a number of factors, including the capture resolution employed at the source, the data rate available for transmission of the captured video, and the display resolution available on the presenting device. Other factors include the relative proportion of the display space formed by the display windows that is occupied by the objects corresponding to the participants.

Overview

Provided herein are systems, methods, and software for facilitating a video conference environment. In at least one implementation, video captured of a scene is received. A modification to display of the video is identified based at least in part on a share of a display space associated with an object in the scene relative to a share of another display space associated with another object in another scene. The modification to the display of the video is then initiated. In another implementation, the modification may also be based on a target share indicated by way of an interactive graphic.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a video conference scenario in an implementation.

FIG. 2 illustrates a video modification process in an implementation.

FIG. 3 illustrates a computing system in an implementation.

FIG. 4 illustrates a video conference architecture in an implementation.

TECHNICAL DISCLOSURE

Implementations described herein provide for improved video conferencing. In at least one implementation, video is captured of participants in a video conference. The captured video includes objects corresponding to the participants. The share of a display space occupied by each object may be analyzed to determine a modification to make to the video such that each object is generally the same size as the other objects. In other words, the share of each display space occupied by each object may generally be the same as the share occupied by each other object. With respect to the visual aesthetics of the video conference, at least some of the conference participants may be represented in visually proportional ways.

FIGS. 1-11, discussed in more detail below, generally depict various scenarios, systems, processes, architectures, and operational sequences for carrying out various implementations. With respect to FIGS. 1-3, FIG. 1 illustrates a video conference scenario in which a video modification process, illustrated in FIG. 2, is employed. FIG. 3 illustrates a computing system for carrying out the video modification process.

Figure 5B:
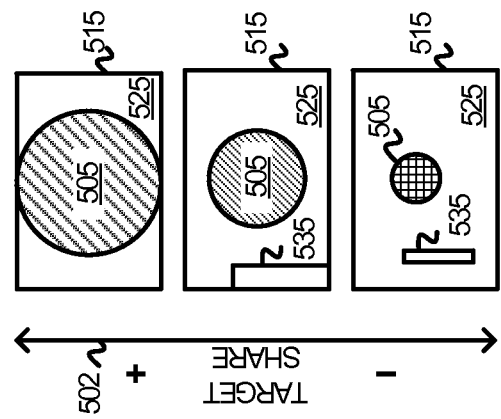
FIG. 5B illustrates video captured for display within a video conference environment and modified based on a target share in an implementation.
Figure 5A:
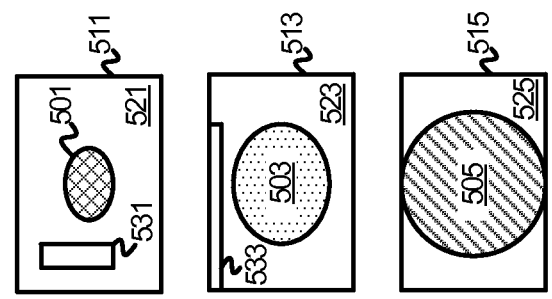
FIG. 5A illustrates video captured for display within a video conference environment in an implementation.
Figure 6:
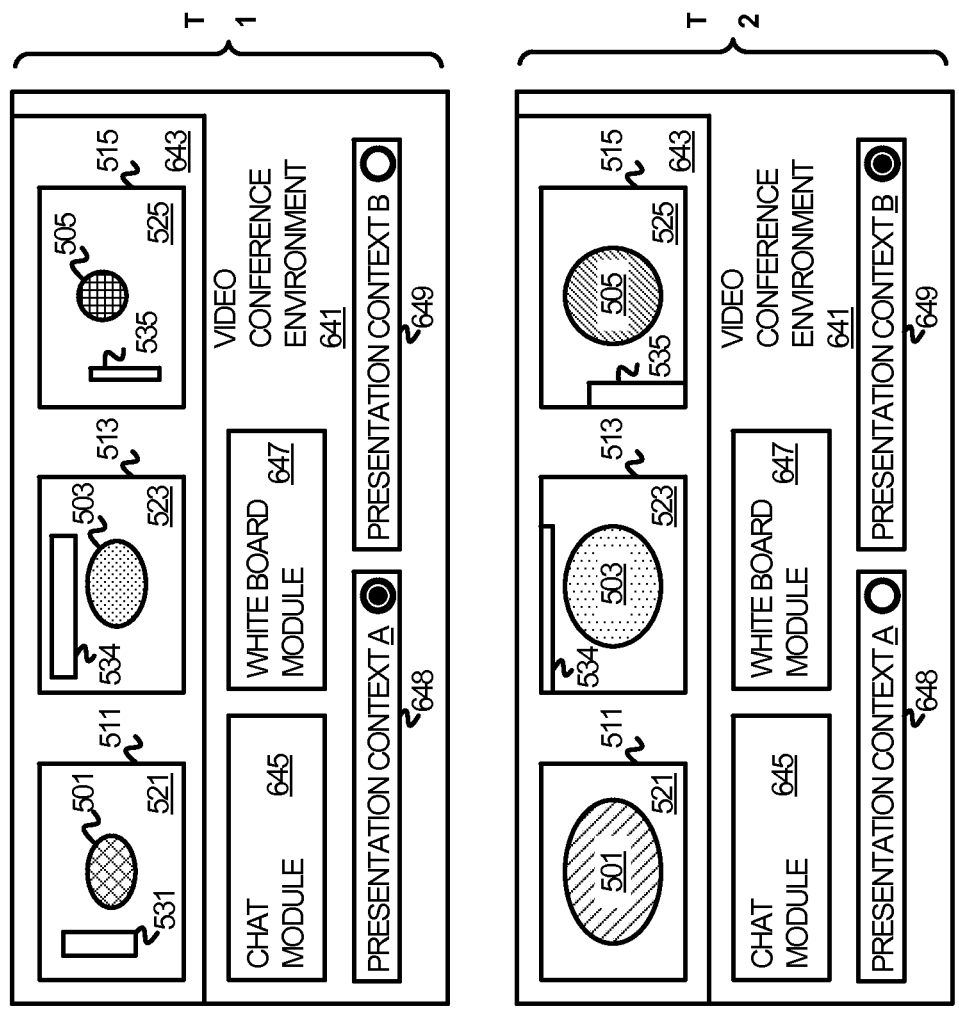
FIG. 6 illustrates two instances of a video conference environment with video modified based on a target share in an implementation.
Figure 7:
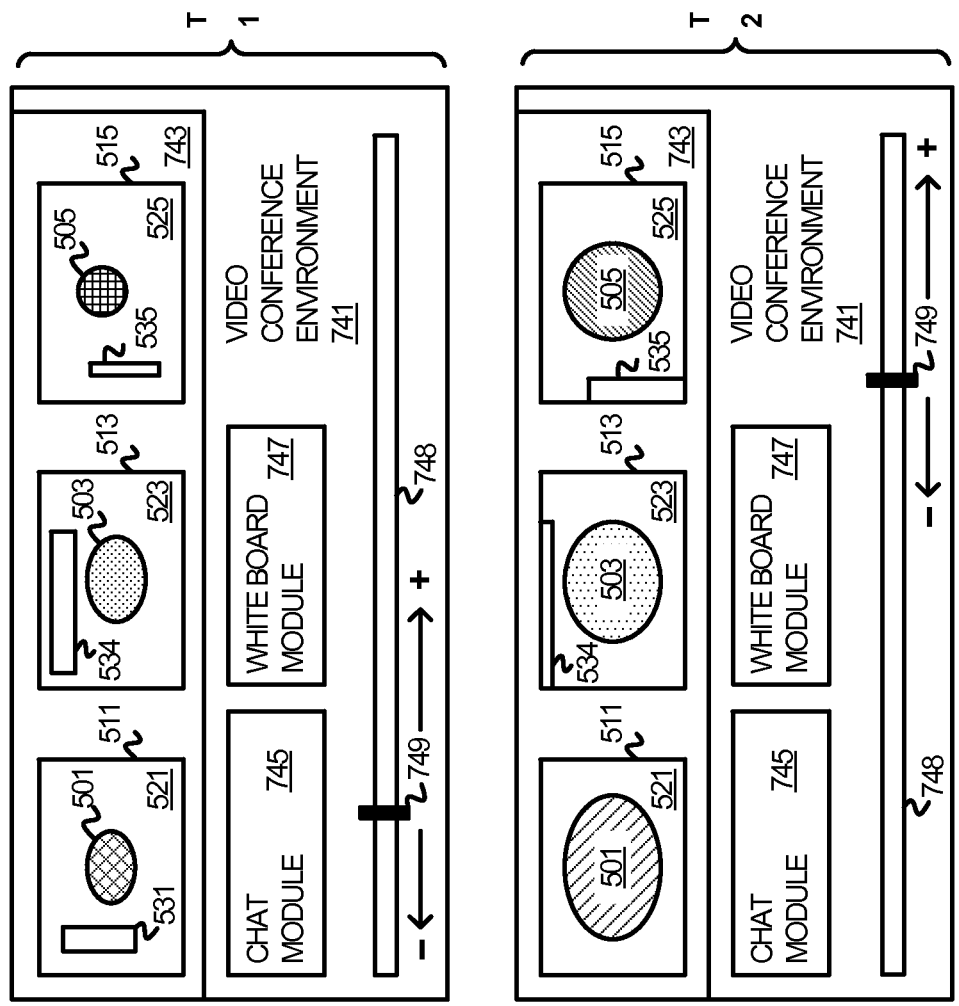
FIG. 7 illustrates two instances of a video conference environment with video modified based on a target share in an implementation.
Figure 8:
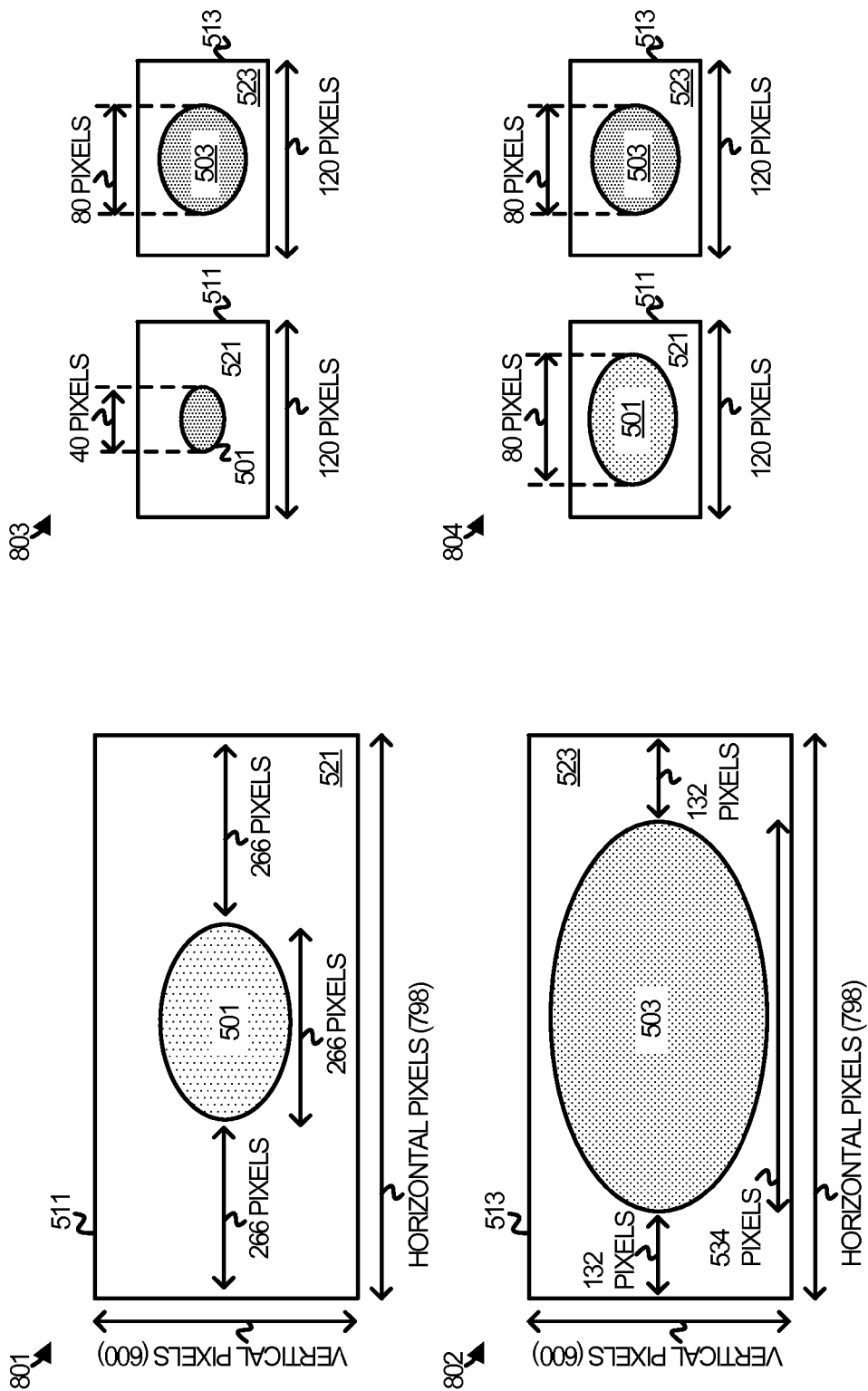
FIG. 8 illustrates several views of video as initially captured and then modified for display within a video conference environment in an implementation.
Figure 9:
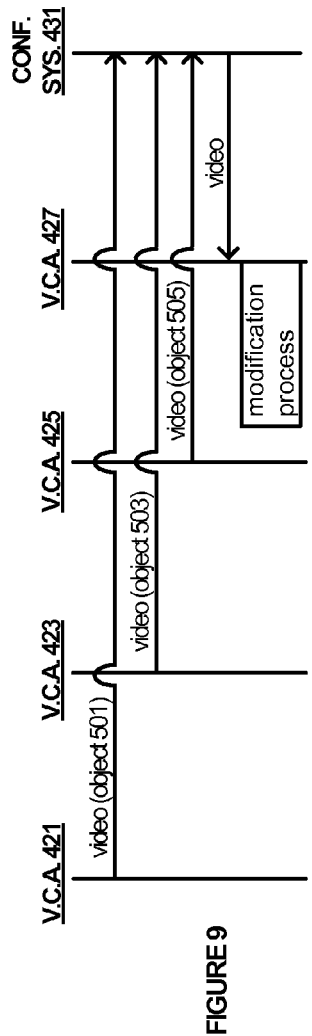
FIG. 9 illustrates video conference operations in an implementation.
Figure 10:
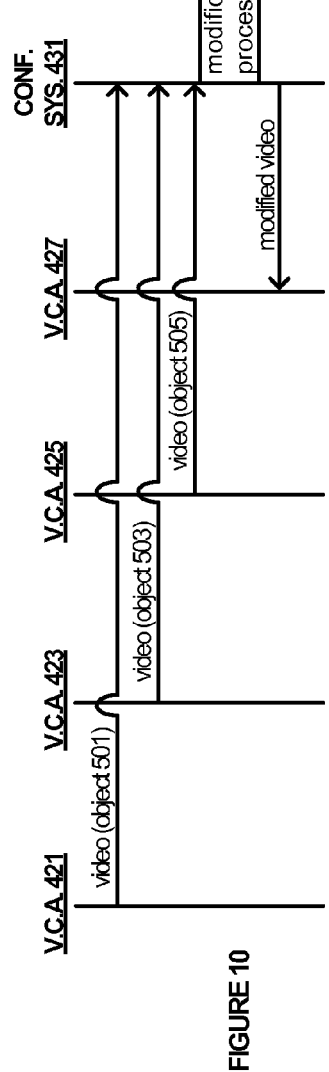
FIG. 10 illustrates video conference operations in an implementation.
Figure 11:
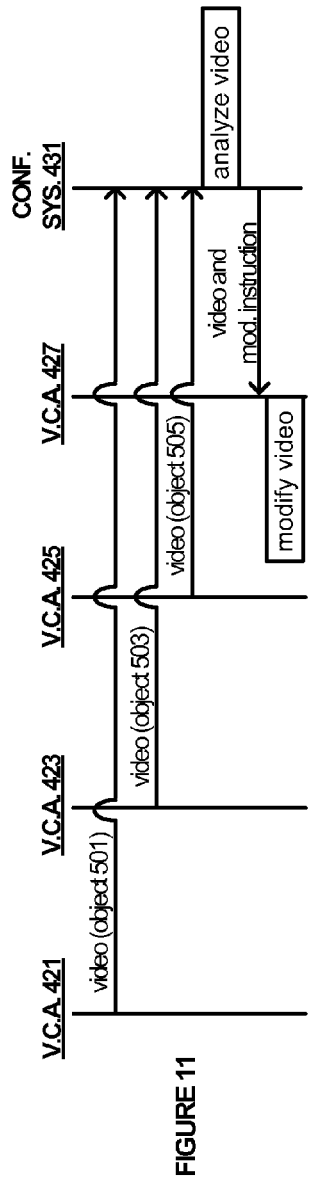
FIG. 11 illustrates video conference operations in an implementation.

With respect to FIGS. 4-11, FIG. 4 illustrates a video conference architecture, while FIG. 5A and FIG. 5B illustrate video captured by elements of the video conference architecture. FIG. 6 and FIG. 7 each illustrate two instances of video conference environments rendered by video conference applications running on elements of the video conference architecture. FIG. 8 illustrates several views of the video provided within the video conference environments. Lastly, FIG. 9, FIG. 10, and FIG. 11 illustrate various operational sequences possibly implemented with respect to the video conference architecture.

Turning now to FIG. 1, video conference scenario 100 illustrates an operational scenario whereby conference video is handled according to modification process 200. The following discussion of FIG. 1 will therefore proceed with reference to the steps of modification process 200 illustrated in FIG. 2.

Initially (at time T1) video is received of objects corresponding to conference participants (step 201). In particular, video 101 includes object 103 corresponding to one participant, while video 111 includes object 113 corresponding to another conference participant. Video 101 also includes object 104 and video 111 includes object 114. Object 104 and object 114 are optional and are illustrated merely for exemplary purposes. The objects may be, for example, head shapes, body shapes, faces, or some other object corresponding to a participant.

Object 103 occupies a share of display space 105. For example, the share of display space 105 occupied by object 103 may be considered in terms of a ratio of the size of object 103 to the size of display space 105. The size of display space 105 may correspond to the size of the underlying frames of video 101, the size of a viewing window within which video 101 may be played, or some other measure or dimension against which the size of object 103 may be compared. Object 104 also occupies a share of display space 105.

Object 113 occupies a share of display space 115. For example, the share of display space 115 occupied by object 113 may be considered in terms of a ratio of the size of object 113 to the size of display space 115. The size of display space 115 may correspond to the size of the underlying frames of video 111, the size of a viewing window within which video 111 may be played, or some other measure or dimension against which the size of object 113 may be compared. Object 114 also occupies a share of display space 115.

Next (at time T2) a modification to at least video 101 is identified based at least in part on the share of display space 105 occupied by object 103 relative to the share of display space 115 occupied by object 113 (step 203). Upon identifying the modification, the modification to video 101 is initiated (step 205). Video 101 may be displayed within video conference environment 131 in its modified form. Video 111 may also displayed within video conference environment 131.

The modification performed on objects may be carried out in a number of ways. In one implementation, a digital zoom in or out may be performed on the video such that the dimension of an object within the video, relative to a display space, changes. In some implementations, an instruction may be provided to a capture device instructing the capture device to zoom in or out on a scene, thereby changing the relative size of an object to the remainder of a captured scene or display space. A variety of other mechanisms may be possible and should be considered within the scope of this disclosure.

In this scenario, the modification made to video 101 results in an increase in the share of display space 105 occupied by object 103. However, it should be understood that the modification may result in a decrease in the share of display space 105 occupied by object 103. The increase in the share of display space occupied by object 103 is evident in the larger size of object 103 at time T2 relative to the initial size of object 103 at time T1. In addition, assuming that the size of display space 105 is unchanged, the entirety of object 104 is no longer visible or otherwise completely contained within display space 105. Thus, the share of display space 105 occupied by both object 103 and object 104 has increased.

Also evident from FIG. 1 is that, from time T1 to time T2, the size of object 103 relative to the size of object 113 has changed. Namely, whereas object 103 and object 105 appeared with considerably different sizes initially, upon modifying video 101, the size object 103 appears generally equal to or substantially similar to the size of object 113. At the very least, upon modifying video 101, the difference in the size of object 103 with respect to object 113 has decreased.

Optionally, video 111 may also be analyzed and modified. However, in this scenario it is assumed for exemplary purposes that video 111 is not modified, or at least not modified substantially. Thus, the size of object 113 and object 114 at time T2 relative to their respective sizes at time T1 remain the same.

From the perspective of a conference participant viewing video conference environment 131, object 103 and object 113 will appear as similarly sized objects. In contrast, had no modification been performed, object 103 and object 113 would appear as differently sized objects, even though both correspond to conference participants. Thus, modification process 200, as described with respect to video conference scenario 100, achieves an aesthetic benefit whereby object corresponding to conference participants appear to a viewer as similarly sized objects.

Referring now to FIG. 3, a computing system suitable for implementing a video modification process is illustrated. Computing system 300 is generally representative of any computing system or systems on which modification process 200 may be suitably implemented. Optionally, computing system 300 may also be suitable for implementing video conference environment 131. Examples of computing system 300 include server computers, client computers, virtual machines, distributed computing systems, personal computers, mobile computers, media devices, Internet appliances, desktop computers, laptop computers, tablet computers, notebook computers, mobile phones, smart phones, gaming devices, and personal digital assistants, as well as any combination or variation thereof.

Computing system 300 includes processing system 301, storage system 303, software 305, and communication interface 307. Computing system 300 also includes user interface 309, although this is optional. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for video modification process 200. Computing system 300 may optionally include additional devices, features, or functionality not discussed here for purposes of brevity and clarity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or subsystems. Storage system 303 may comprise additional elements, such as a controller, capable of communicating with processing system 301.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 may be implemented in program instructions and among other functions may, when executed by computing system 300, direct computing system 300 to receive video captured of an object in a scene corresponding to a participant in a video conference, identify a modification to a display of the video within a video conference environment based on a share of a display space associated with the object relative to a share of another display space associated with another object corresponding to another participant in the video conference, and initiate the modification to the display of the video within the video conference environment.

Software 305 may include additional processes, programs, or components, such as operating system software or other application software. Software 305 may also comprise firmware or some other form of machine-readable processing instructions capable of being executed by processing system 301.

In general, software 305 may, when loaded into processing system 301 and executed, transform processing system 301, and computing system 300 overall, from a general-purpose computing system into a special-purpose computing system customized to facilitate a video conference environment as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement modification process 200 and optionally render video conference environment 131. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to video 101 and video 111. As an example, video 101 could be considered transformed from one state to another when subject to video modification process 200. In a first state, object 103 occupies a certain share of display space 105. Upon modifying video 101, object 103 occupies a different share of display space 105, thereby changing video 101 to a second, different state.

Referring again to FIG. 3, communication interface 307 may include communication connections and devices that allow for communication between computing system 300 other computing systems not shown over a communication network or collection of networks. Examples of connections and devices that together allow for inter-system communication include network interface cards, antennas, power amplifiers, RF circuitry, transceivers, and other communication circuitry. The aforementioned network, connections, and devices are well known and need not be discussed at length here.

User interface 309 may include a mouse, a voice input device, a touch input device for receiving a gesture from a user, a motion input device for detecting non-touch gestures and other motions by a user, and other comparable input devices and associated processing elements capable of receiving user input from a user, such as a camera or other video capture device. Output devices such as a display, speakers, printer, haptic devices, and other types of output devices may also be included in user interface 309. The aforementioned user input devices are well known in the art and need not be discussed at length here. User interface 309 may also include associated user interface software executable by processing system in support of the various user input and output devices discussed above. Separately or in conjunction with each other and other hardware and software elements, the user interface software and devices may be considered to provide a graphical user interface, a natural user interface, or any other kind of user interface.

FIG. 4 illustrates video capture architecture 400 in an implementation. Video capture architecture 400 includes client device 411, client device 413, client device 415, client device 417, and conference system 431. Client devices 411, 413, 415, and 417 may exchange at least some conference communications with each other via conference system 431 over communication network 430. In this implementation, client devices 411, 413, 415, and 417 are operated by or otherwise associated with users 401, 403, 405, and 407 respectively to engage in a video conference with each other. Towards that end, each client device 411, 413, 415, and 417 includes running thereon video conference applications 421, 423, 425, and 427 respectively.

Client devices 411, 413, 415, and 417 may each be any type of computing system capable of hosting a video conference application. The video conference application may be locally installed and executed, hosted remotely and accessibly through a web browser, or even streamed for local execution, as well as provisioned or delivered according to any number of other techniques, combinations of techniques, or variations thereof. Examples of client devices include desktop or laptop computers, tablets, mobile phones, gaming systems, dedicated conferencing systems, or any other suitable communication device.

Conference system 431 may be any system of collection of systems capable of hosting a video conference service that allows for participation in video conferences by client devices. While conference system 431 is illustrated as a stand-alone of centralized system, it should be understood that conference system 431 may be distributed among multiple computing systems. In some implementations, the functionality provided by conference system 431 may be distributed amongst peers, allowing the video conference service to be provisioned according to a peer-to-peer model. Other combinations or variations thereof are possible.

Communication network 430 may be any network or collection of networks capable of carrying video conference communications. Examples of communication network 430 include internets, intranets, local area networks, wide area networks, wireless networks, and wired networks, as well as any combination or variation thereof.

In operation, users may arrange to participate in a video conference with each other. In some cases, the users may initiate invitations, exchange links, dial each other, or in some other manner notify each other of a desire to participate in a conference. Many well-known systems and software provide such conference capabilities and need not be discussed at length here. Once the conference is established, video is captured of the participants by their respective video capture devices and provide to conference system 431 for distribution to the other conference participants.

One particular example video conference involving users 401, 403, 405, and 407 is illustrated in FIGS. 5-11. In this example, the video conference is generally described from the perspective of user 407 and client device 417. For example FIG. 5A illustrates video that may be received by client device 417 and presented to user 407 by way of video conference application 427. FIG. 6 and FIG. 7 illustrate video conference environments that may be generated by video conference application 427, within which the conference video is displayed. FIG. 8 illustrates in more detail the modification of video within a video conference environment. FIGS. 9-11 illustrates several ways in which video may be exchanged and handled in order to provide the video conference.

Referring now to FIG. 5A, video 511, 513, and 515 is illustrated. Video 511, 513, and 515 is representative of video captured by client devices 411, 413, and 415 illustrated in FIG. 4, and communicated to client device 417 by way of conference system 431. Video 511 includes object 501, corresponding to user 401. User 401 is a participant in the video conference with users 403, 405, and 407. Video 511 also includes object 531. Object 501 and object 531 each occupy a share of display space 521. Video 513 includes object 503, corresponding to user 403. User 403 is also a participant in the video conference with users 401, 405, and 407. Video 513 also includes object 533. Object 503 and object 533 each occupy a share of display space 523. Video 515 includes object 505, corresponding to user 405. User 405 is another participant in the video conference with users 401, 403, and 407. Object 505 occupies a share of display space 525.

As will be discussed in more detail with respect to FIGS. 6-8, video 511, 513, and 515 may be processed and rendered within a video conference environment. Specifically, client device 417 executing video conference application 427 processes and potentially modifies portions of video 511, 513, and 515 for display within a video conference environment, such as video conference environment 641 and video conference environment 741 discussed in more detail below. The video may be modified based on a target share of display share accorded to each object in the video. FIG. 5B illustrates with particularity how an object may change based on variations in a target share.

Referring to FIG. 5B, video 515 captured by client device 415 is illustrated for exemplary purposes. As target share 502 is increased or decreased, the size of object 505 changes with respect to display space 525. For example, at the upper most end of target share 502, object 505 has a vertical dimension nearly equal to the vertical dimension of displace space 525. In contrast, towards the lower most end of target share 502, object 505 has dimensions generally much smaller than the dimensions of display space 525. Note that object 535 is entirely visible within display space 525 towards the lower end of target share 502. When set towards the middle range of target share 502, object 505 is smaller than when the target share is set towards the upper end, but larger than when the target share is set towards the lower end. Note that object 535 is partially visible within display space 525 when the target share is set towards the middle range.

In other words, as target share 502 is adjusted, the share of display space 525 occupied by object 505 varies generally proportionally. Reducing target share 502 results in a reduced share of display space 525 occupied by object relative to when target share 502 is increased. It should be understood that target share 502 may be applied to video 511 and video 522 as well as video 515.

FIG. 6 provides one such illustration of a video conference environment 641 whereby video may be modified based on a target share, as demonstrated in FIG. 5B. Namely, video may be modified such that the relative share of display space occupied by objects captured in the video varies depending upon how a target share is defined or set.

Video conference environment 641 includes video module 643, chat module 645, and white board module 647. Video conference environment 641 also includes interactive graphic 648 and interactive graphic 649, each representative of presentation context A and presentation context B respectively, that may be selected by a user input. Depending upon the target share selected or otherwise indicated by the user input, some modifications may be made to video 511, 513, and 515 such that objects 501, 503, and 505 each occupy a share of display spaces 521, 523, and 525 in accordance with the target share.

In this example, presentation context A and presentation context B correspond to different target shares selectable by the user input. In this example, presentation context A corresponds to a target share value less than the target share corresponding to presentation context B. Thus, when presentation context A is selected, the share of display spaces within video module 643 occupied by objects is less than the share of the display spaces occupied by objects when presentation context B is selected. Presentation context A may correspond to, for example, a wide presentation context where the display intent is to display a wide view of participants in the video conference. In contrast, presentation context B may correspond to, for example, a close-in presentation context where the display intent is to display a close-in view of the participants in the video conference.

To demonstrate how varying a target share may result in different modifications to video 511, 513, and 515, presentation context A is initially selected at time T1, while presentation context B is selected at time T2. When presentation context A is selected, the share of display space 521 occupied by object 501 is relatively unchanged compared to the share of display space 521 occupied by object 501 when initially captured in video 511, as illustrated in FIG. 5A. However, the share of display space 523 occupied by object 503, upon selection of presentation context A, is reduced compared to when initially captured in video 513, as illustrated FIG. 5A. Likewise, the share of display space 525 occupied by object 505, upon selection of presentation context A, is reduced compared to when initially captured in video 515, as also illustrated FIG. 5A.

In contrast, upon selection of presentation context B at time T2, the share of display spaces 521, 523, and 525 occupied by objects 501, 503, and 505 respectively changes compared to when presentation context A is selected at time T1. The size of object 501 is larger than when presentation context A is selected, as is the size of object 503 and 505. In other words, the share of display spaces 521, 523, and 525 occupied by objects 501, 503, and 505 at time T2 is greater than the share at time T1. Note also that, when presentation context b is selected, the share of display space 521 occupied by object 501 is increased compared to the share of display space 521 occupied by object 501 when initially captured in video 511, as illustrated in FIG. 5A. The share of display space 523 occupied by object 503, upon selection of presentation context A, is generally unchanged compared to when initially captured in video 513, as also illustrated FIG. 5A. The share of display space 525 occupied by object 505, upon selection of presentation context A, is reduced compared to when initially captured in video 515, as also illustrated FIG. 5A.

FIG. 7 provides another illustration of a video conference environment 741 whereby video may be modified based on a target share, as demonstrated in FIG. 5B. Namely, video may be modified such that the relative share of display space occupied by objects captured in the video varies depending upon how a target share is defined or set.

Video conference environment 741 includes video module 743, chat module 745, and white board module 747. Video conference environment 741 also includes an interactive graphic comprised of a range graphic 748 and a selector graphic 749. Range graphic 748 is representative of a range of target share values that may be selected by a user input by moving or otherwise positioning selector graphic 749. Depending upon the target share selected or otherwise indicated by the user input, some modifications may be made to video 511, 513, and 515 such that objects 501, 503, and 505 each occupy a share of display spaces 521, 523, and 525 in accordance with the input target share.

In this example, selector graphic 749 may be slid or otherwise moved through the range of target share values represented by range graphic 748. In this example, the left most portion of range graphic 748 corresponds to a target share value less than the target share corresponding to the right most portion of range graphic 748. Thus, when selector graphic 749 is positioned toward the left of range graphic 748, the share of display spaces within video module 743 occupied by objects is less than the share of the display spaces occupied by objects when selector graphic 749 is positioned toward the right of range graphic 784. The target share values selectable on range graphic 748 may correspond to, for example, a wide presentation context where the display intent is to display a wide view of participants in the video conference or a close-in presentation context where the display intent is to display a close-in view of the participants in the video conference.

To demonstrate how varying a target share may result in different modifications to video 511, 513, and 515, selector graphic 749 is initially positioned toward the left end of range graphic 748 at time T1, selector graphic 749 is positioned toward the ride end of range graphic 748 at time T2. At time T1, the share of display space 521 occupied by object 501 is relatively unchanged compared to the share of display space 521 occupied by object 501 when initially captured in video 511, as illustrated in FIG. 5A. However, the share of display space 523 occupied by object 503 is reduced compared to when initially captured in video 513, as illustrated FIG. 5A. Likewise, the share of display space 525 occupied by object 505 is reduced compared to when initially captured in video 515, as also illustrated FIG. 5A.

In contrast, upon positioning selector graphic 749 toward the right end of range graphic 748 at time T2, the share of display spaces 521, 523, and 525 occupied by objects 501, 503, and 505 respectively changes compared to the scenario illustrated with respect to time T1. The size of object 501 is larger at time T1 than at time T2, as is the size of object 503 and object 505. In other words, the share of display spaces 521, 523, and 525 occupied by objects 501, 503, and 505 at time T2 is greater than the share at time T1. Note also that at time T2 the share of display space 521 occupied by object 501 is increased compared to the share of display space 521 occupied by object 501 when initially captured in video 511, as illustrated in FIG. 5A. The share of display space 523 occupied by object 503 is generally unchanged compared to when initially captured in video 513, as also illustrated FIG. 5A. The share of display space 525 occupied by object 505 is reduced compared to when initially captured in video 515, as also illustrated FIG. 5A.

FIG. 8 illustrates view 801 and view 802 of video 511 and 513 respectively as initially captured by client device 411 and client device 413 respectively. FIG. 8 also illustrates view 803 of video 511 and video 513 as initially displayed within a video conference environment. Finally, FIG. 8 illustrates view 804 of video 511 and video 533 as displayed upon identifying an initiating a modification to at least a portion of the video. It should be understood that the pixel dimensions provided in FIG. 8 are merely illustrative and could vary in any implementation.

Referring to view 801, video 511 is defined or characterized in terms of pixel dimensions. Video 511 includes 798 horizontal pixels and 600 vertical pixels. Object 501 is approximately 266 pixels wide. Thus, the total horizontal dimension of video 511 includes the 266 pixels of object 501 plus two 266 pixel sections to the left and right. In terms of a simple ratio, object 501 occupies approximately ⅓ of display space 521.

Referring to view 802, video 513 is also defined or characterized in terms of pixel dimensions. Video 513 includes 798 horizontal pixels and 600 vertical pixels, similar to video 511. Object 503 is approximately 534 pixels wide when initially captured, or twice as large as object 50'. Thus, the total horizontal dimension of video 513 includes the 534 pixels of object 503 plus two 132 pixel sections to either side. In terms of a simple ratio, object 503 occupies approximately ⅔ of display space 521.

Referring now to view 803, illustrated are video 511 and video 513 upon being transmitted by client device 411 and client device 413 respectively, to possible conference system 431 or another client device, such as client device 417. Due to data transmission constraints or some other factor, the total pixel size count of video 511 and video 513 has been reduced relative to their respective pixel counts at the time of capture. Video 511 now has just 120 horizontal pixels.

Likewise, video 513 now has just 120 pixels. To maintain scale, object 501 is rendered with 40 pixels and is therefore approximately ⅓ the horizontal width of video 511. Object 503 is rendered with 80 pixels or ⅔ the width of video 513. Note that object 501 is approximately half the size of object 504 in view 803.

Referring now to view 804, video 511 and video 513 are illustrated upon modification to video 511. In particular, video 511 has been modified based on the share of display space 521 occupied by object 501 relative to the share of display space 523 occupied by object 503 in view 803. In view 803, object 501 occupies approximately ⅓ of display space 521, whereas object 503 occupies ⅔ of display space 523. It is therefore determined that the share of display space 521 occupied by object 501 be increased in order to substantially equalize the relative shares.

As can be seen from view 804, the size of object 501 is increased such that its horizontal pixel count is now 80 pixels, or approximately equal to the horizontal pixel count of object 503. Note that the fill characteristic of object 501 changes from view 803 to view 804. This is intended to demonstrate that the resolution of object 501 may decrease from view 803 to view 804 as its size is expanded.

FIG. 9 illustrates an operational sequence with respect to video conference architecture 400 illustrated in FIG. 4. Video conference application 421, executing on client device 411, captures video and transmits the video to conference system 431. Similarly, video conference application 423 and video conference application 425, executing on client device 413 and client device 415 respectively, capture video and transmit the video to conference system 431. The video captured by video conference application 421 includes at least object 501; the video captured by video conference application 423 includes at least object 503; and the video captured by conference application 425 includes at least object 505.

In this implementation, conference system 431 provides the video, possibly as separate video streams or files or as an integrated video stream or file, to video capture application 427 executing on client device 417. It should be understood that conference system may provide the video or portions thereof to any or all of the other video capture applications 421, 423, and 425. It should be understood that video conference application 427 may also capture video and provide its captured video to conference system 431 for distribution to video conference applications 421, 423, and 425.

Upon receiving the video from conference system 431, video conference application 427 applies a modification process, such as modification process 200, so that objects 501, 503, and 505 may have similar sizes and proportions relative to display spaces associated with the objects when rendered and displayed within a video conference environment. As discussed previously, the modification process may result in increases or decreases to some or all of objects 501, 503, and 505.

FIG. 10 illustrates another operational sequence with respect to video conference architecture 400 illustrated in FIG. 4. Video conference application 421, executing on client device 411, captures video and transmits the video to conference system 431. Similarly, video conference application 423 and video conference application 425, executing on client device 413 and client device 415 respectively, capture video and transmit the video to conference system 431. The video captured by video conference application 421 includes at least object 501; the video captured by video conference application 423 includes at least object 503; and the video captured by conference application 425 includes at least object 505.

In this implementation, conference system 431 applies a modification process, such as modification process 200, so that objects 501, 503, and 505 may have similar sizes and proportions relative to display spaces associated with the objects when rendered and displayed within a video conference environment. As discussed previously, the modification process may result in increases or decreases to some or all of objects 501, 503, and 505.

Upon modifying the video, conference system 431 provides the video, possibly as separate video streams or files or as an integrated video stream or file, to video conference application 427 executing on client device 417. Video conference application 427 renders the video within a video conference environment. It should be understood that conference system may provide the video or portions thereof to any or all of the other video capture applications 421, 423, and 425. It should also be understood that video conference application 427 may also capture video and provide its captured video to conference system 431 for distribution to video conference applications 421, 423, and 425.

FIG. 12 illustrates yet another operational sequence with respect to video conference architecture 400 illustrated in FIG. 4. Video conference application 421, executing on client device 411, captures video and transmits the video to conference system 431. Similarly, video conference application 423 and video conference application 425, executing on client device 413 and client device 415 respectively, capture video and transmit the video to conference system 431. The video captured by video conference application 421 includes at least object 501; the video captured by video conference application 423 includes at least object 503; and the video captured by video conference application 425 includes at least object 505.

In this implementation, conference system 431 applies a portion of modification process, such as modification process 200, to analyze whether or not, and to what extent, objects 501, 503, and 505 may be modified. As discussed previously, the modification process may result in increases or decreases to some or all of objects 501, 503, and 505. Conference system 431 determines to what extent each object 501, 503, and 505 should be modified, if at all, and communicates the video and a modification instruction to video conference application 427. Conference system 431 may provide the video possibly as separate video streams or files or as an integrated video stream or file to video conference application 427.

Upon receiving the video from conference system 431, video conference application 427 applies another portion of the modification process so that objects 501, 503, and 505 may have similar sizes and proportions relative to display spaces associated with the objects when rendered and displayed within a video conference environment. It should be understood that conference system 431 may provide the modification instruction and the video or portions thereof to any or all of the other video capture applications 421, 423, and 425. It should also be understood that video conference application 427 may also capture video and provide its captured video to conference system 431 for distribution to video conference applications 421, 423, and 425.

In a brief operational scenario, a process for facilitating a video conference environment includes receiving video captured of a first scene including a first object corresponding to a first participant in a video conference, identifying a modification to a display of the video within the video conference environment based on display information including a first share of a first display space associated with the first object relative to a second share of a second display space associated with a second object corresponding to a second participant in the video conference, and initiating the modification to the display of the first video within the video conference environment.

In some implementations, the modification to the display of the first video includes a reduction in a difference between the first share of the first display space associated with the first object and the second share of the second display space associated with the second object. In some implementations, the modification to the display of the first video includes an increase in a size of the first object such that the first share of the first display space associated with the first object increases upon implementing the modification. In some implementations, the modification to the display of the first video includes a decrease in a size of the first object such that the first share of the first display space associated with the first object decreases upon implementing the modification.

In an implementation, the process may also include, prior to identifying the modification to the display of the video, receiving an indication of a preferred share of each of a plurality of display spaces to be associated with a plurality of objects corresponding to participants in the video conference and identifying an initial modification to the display of the video within the video conference environment based at least in part on an initial second share of the second display space associated with the second object and the preferred share. The process may also include initiating the initial modification to the display of the video within the video conference environment.

In yet another implementation, the process may include, prior to identifying the modification to the display of the video, receiving a selection of the second display space from multiple display spaces on which to base, at least in part, the identifying of the modification to the display of the video. The display information may be representative of minimum acceptable size criteria for the first object.

In another brief example, a video conference environment may be rendered by a computing system. The computing system receives video captured of scenes including objects corresponding to participants in the video conference. The computing system, executing a video conference application, generates and displays an interactive share graphic configured to receive an input representative of at least a target share of each of multiple display spaces to be occupied by each of the objects. The computing system modifies at least a portion of the video based on display information including the target share and a share of each of the multiple display spaces occupied by each of the objects. Upon modifying at least the portion of the video, the computing system displays the video within the video conference environment.

In some implementations, the interactive share graphic may be a graphical representation of a first presentation context and a second presentation context, wherein the input may be a selection of one of the first presentation context and second presentation context. In some implementations, the first presentation context is a seated presentation context and the second presentation context is a standing presentation context.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing system comprising:
   one or more computer readable storage media;
   a processing system operatively coupled to the one or more computer readable storage media; and
   program instructions stored on the one or more computer readable storage media for facilitating a video conference, wherein the program instructions, when executed by the processing system, direct the processing system to at least:
   receive video captured of a first scene comprising a first object corresponding to a first participant in the video conference;
   receive video captured of a second scene comprising a second object corresponding to a second participant in the video conference;
   display the video captured of the first scene and the video captured of the second scene simultaneously in the video conference;
   identify a zoom operation to perform on the video captured of the first scene to equalize a size of the first object with the size of the second object as displayed in the video conference; and
   perform the zoom operation on the video captured of the first scene to reduce a difference between a first share of the first display space occupied by the first object and a second share of the second display space occupied by the second object until they are equal.

2. The computing system of claim 1 wherein the zoom operation is based on display information, wherein the display information further comprises minimum acceptable size criteria for the first object.

3. The computing system of claim 2 wherein the zoom operation comprises a zoom-in on the first object.

4. The computing system of claim 2 wherein the zoom operation comprises a zoom-out on the first object.

5. The computing system of claim 1 wherein the program instructions, when executed by the processing system, further direct the processing system to:
   prior to identifying the zoom operation, receive an indication of a preferred share of each of a plurality of display spaces to be occupied by a plurality of objects corresponding to a plurality of participants in the video conference;
identify an initial zoom operation based at least in part on an initial second share of the second display space occupied by the second object and the preferred share;
initiate the initial zoom operation.

6. The computing system of claim 1 wherein the program instructions, when executed by the processing system, further direct the processing system to, prior to identifying the zoom operation, receive a selection of the second display space from the plurality of display spaces on which to base, at least in part, the identifying of the zoom operation.

7. A method for facilitating a video conference comprising:
receiving video captured of a first scene comprising a first object corresponding to a first participant in the video conference;
receiving video captured of a second scene comprising a second object corresponding to a second participant in the video conference;
displaying the video captured of the first scene and the video captured of the second scene simultaneously in the video conference;
identifying a zoom operation to perform on the video captured of the first scene to equalize a size of the first object with the size of the second object as displayed in the video conference; and
performing the zoom operation on the video captured of the first scene to reduce a difference between a first share of the first display space occupied by the first object and a second share of the second display space occupied by the second object until they are equal.

8. The method of claim 7 wherein the zoom operation comprises a zoom-in on the first object.

9. The method of claim 7 wherein the zoom operation comprises a zoom-out on the first object.

10. The method of claim 8 wherein the method further comprises:
prior to identifying the zoom operation, receiving an indication of a preferred share of each of a plurality of display spaces to be occupied by a plurality of objects corresponding to a plurality of participants in the video conference; and
identifying an initial zoom operation based at least in part on an initial second share of the second display space occupied by the second object and the preferred share;
initiating the initial zoom operation.

11. The method of claim 7 wherein the method further comprises, prior to identifying the zoom operation, receiving a selection of the second display space from a plurality of display spaces on which to base, at least in part, the identifying of the zoom operation.

12. The method of claim 7 wherein the zoom operation is based on display information and wherein the display information further comprises minimum acceptable size criteria for the first object.

13. A method of operating a video conferencing system comprising:
receiving video captured of a first scene comprising a first object corresponding to a first participant in a video conference;
receiving video captured of a second scene comprising a second object corresponding to a second participant in the video conference;
identifying a zoom operation to perform on the video captured of the first scene to equalize a size of the first object with the size of the second object as displayed in the video conference;
transmit the video of the first scene and the video of a second scene to be displayed in a video conference environment; and
instruct the video conference environment to perform the zoom operation on the video captured of the first scene to reduce a difference between a first share of the first display space occupied by the first object and a second share of the second display space occupied by the second object until they are equal.

14. The method of claim 13 wherein the zoom operation comprises a zoom-in on the first object.

15. The method of claim 13 wherein the zoom operation comprises a zoom-out on the first object.

16. The method of claim 7 wherein the method further comprises:
prior to identifying the zoom operation, receiving an indication of a preferred share of each of a plurality of display spaces to be occupied by a plurality of objects corresponding to a plurality of participants in the video conference; and
identifying an initial zoom operation based at least in part on an initial second share of the second display space occupied by the second object and the preferred share;
instruct the video conference environment to perform the initial zoom operation.

17. The method of claim 7 wherein the method further comprises, prior to identifying the zoom operation, receiving a selection of the second display space from a plurality of display spaces on which to base, at least in part, the identifying of the zoom operation.

* * * * *